Fig. 3.

Feb. 22, 1955   G. H. YOUNG   2,702,606
CAR PARKING SYSTEM AND APPARATUS
Filed Nov. 15, 1950   8 Sheets-Sheet 8

INVENTOR.
George H. Young
BY Albert J. McCaleb
Atty.

United States Patent Office 2,702,606
Patented Feb. 22, 1955

2,702,606

CAR PARKING SYSTEM AND APPARATUS

George H. Young, Oak Park, Ill.

Application November 15, 1950, Serial No. 195,852

7 Claims. (Cl. 187—8.41)

This invention relates to an improved parking system and apparatus for automobiles, and more particularly to such an improved system and apparatus which is adapted for use in congested areas for increasing the car parking capacity of parking lots and the like.

It is an object of my invention to provide a multiple car lift system for over and under car parking characterized by simplicity and by relatively low installation and maintenance costs.

It is a further object of my invention to provide a multiple car lift system for over and under car parking in which an overall saving of space is obtained and wherein the arrangement of parts is such that it provides ample room for the opening of doors of parked cars.

A still further object of the invention is a multiple car lift system in which supporting columns of the individual car lift units are displaced in a direction lateral to a row of such units so as to minimize waste space between the car lift units.

A still further object of the invention is to provide a multiple car lift system utilizing hydraulic lifts and in which a single source of hydraulic pressure may be used to operate several of the car lifts.

Another object of the invention is the provision of a car lift apparatus for over and under parking which requires a minimum of controls and on which an automobile is effectively maintained on a level plane while being raised.

A further object of the invention is the provision of means for insuring that a car on an elevated car lift cannot roll off until the lift is lowered. Such means may also be provided with a safety release lock which will automatically release such means when the platform is lowered.

As another object, my invention comprehends a car lift structure wherein two support posts are provided and wherein a single hydraulic ram effects the movement of a platform relative to the support posts.

A further object of my invention is the provision of an improved lift assembly utilizing a slide and bearing arrangement which eliminates the necessity for lubricating the supports of a car lifting platform.

Still a further object of the invention is a general improvement and simplification of the structural details and combinations of the car lift apparatus.

My invention also has within its purview the provision of a hydraulic lift structure for automobiles wherein the hydraulically actuated lifting ram is mounted between and in parallel relationship to the runways of a lifting platform and operates within the space limit of the platform.

Further objects and advantages will appear from the following description of the preferred embodiments of the invention and from the eight sheets of drawings appended hereto, in which.

Figure 1:
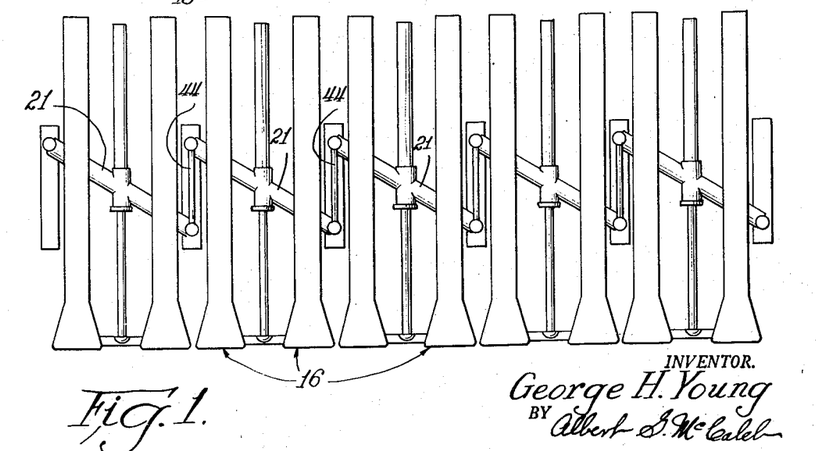
Fig. 1 is a diagrammatic plan view of a multiple car lift system embodying my invention.

The multiple car lift system and apparatus, as shown in Fig. 1, generally comprises a plurality of car lifts 16 positioned in a straight row to provide a series of car parking stalls closely adjacent one another and suited to use in a car parking lot. The general arrangement of the parts of each of the car lifts and of such lifts in relation to each other is such that it affords ample room for the opening of car doors, whereby a driver has adequate room for entering and leaving a parked car. Such accessibility of parked cars is provided mainly by the placement of the vertical supporting posts of the car lift and the manner of supporting the car platforms, as will be more fully described.

Figure 2:
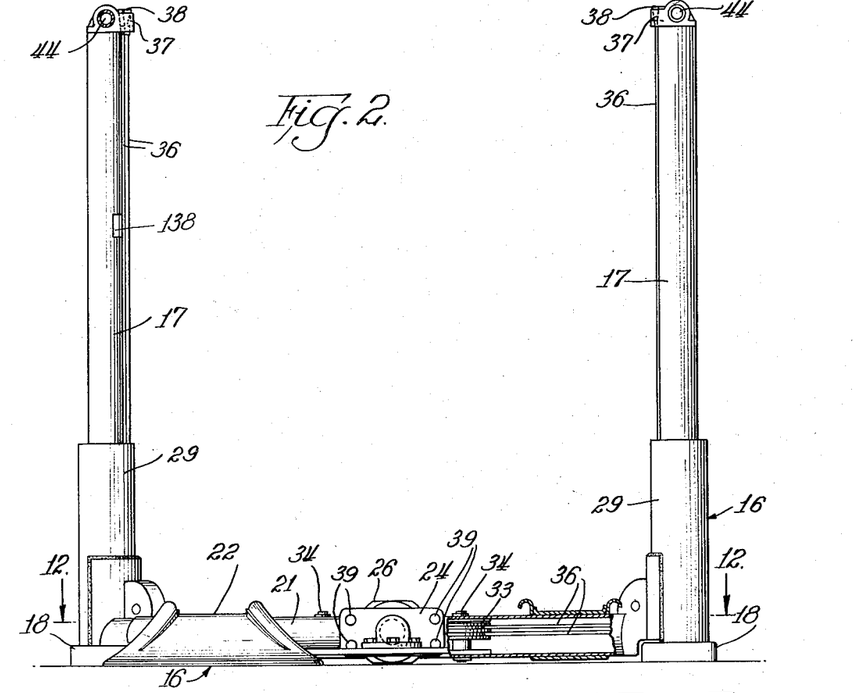
Fig. 2 is a front elevational view, partly in section, showing a single car lift embodying the invention.
Figure 3:
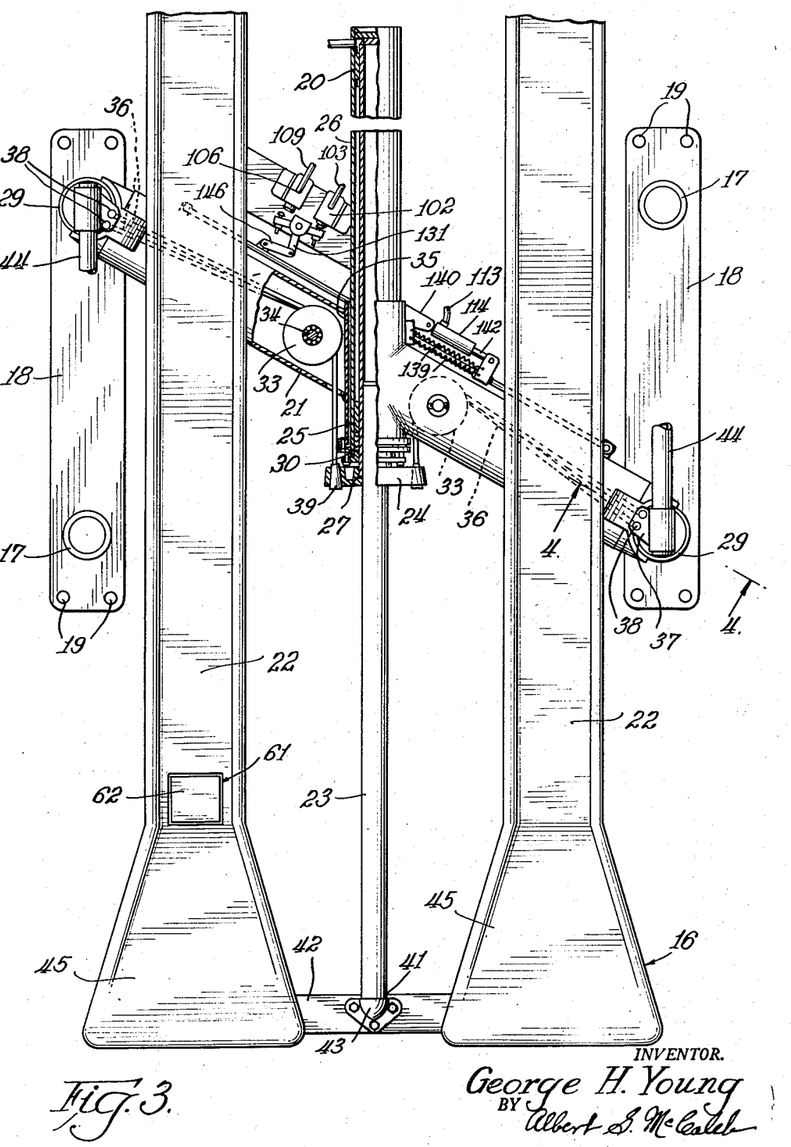
Fig. 3 is a fragmentary plan view, partly in section, of the car lift shown in Fig. 2.

In Figs. 2 and 3 is shown one of my car lifts 16 which forms one unit of the multiple car lift system shown in Fig. 1. This car lift comprises a pair of support columns 17 extending vertically from mounting bases 18. The mounting bases 18 are adapted to be secured to the pavement or other surface of a parking lot or building, as by bolts 19. Each of the mounting bases 18 is equipped to support two columns in spaced relationship longitudinally of the lift stall, although columns on each base are used for adjacent car lift units 16 of a series.

The support columns 17 and their bases 18 are spaced laterally from each other to define a car parking stall of sufficient width to accommodate an automobile. Extending across the car parking space of each stall and between the support columns of the stalls is a lateral support 21 which, as a result of the relative placements of the columns of the stall, extends diagonally of the stall. There being two spaced support columns on each mounting base, the lateral supports 21 of a series extend between alternate front and rear columns 17, so that space is provided between the columns for opening car doors and for a driver to enter or leave the car.

Supported on the lateral support 21 are runways 22 which are adapted to receive the wheels of a parked automobile. The runways 22 are so positioned on the lateral support 21 that the weight of the parked car is practically balanced relative to said lateral support and its supporting columns.

Also carried by the lateral support 21 and being secured thereto, is shaft 23, which shaft 23 preferably extends parallel to the runways 22 and has associated therewith a cable-securing crosshead 24 and a hydraulic cylinder 26. The crosshead 24 slidably embraces the shaft 23 and is adapted to be moved therealong. The hydraulic cylinder 26, as will be more fully pointed out, has its piston 27 secured to the crosshead 24, said piston being adapted to slide relative to the cylinder on bearings 20 and 25 as a result of hydraulic pressure, and being hydraulically sealed at the end of the cylinder by a packing gland 30 so that the crosshead and piston are moved linearly along the shaft 23. The end of the hydraulic cylinder adjacent the shaft 23 extends through and is secured to the lateral support 21, support being provided for the cylinder by a tubular collar 35.

Figures 4, 5:
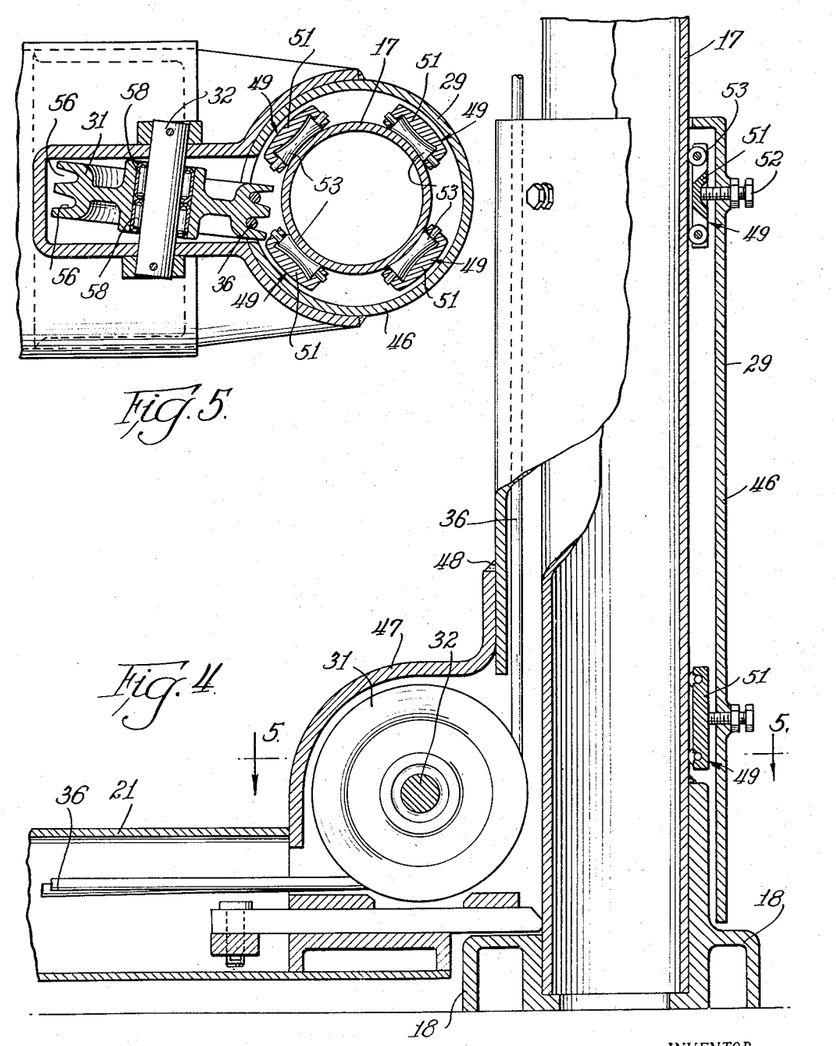
Fig. 4 is a fragmentary sectional view taken substantially on a line 4—4 of Fig. 3 and drawn to an enlarged scale to show details and relationships of parts in the preferred embodiment of my invention.
Fig. 5 is a fragmentary sectional view taken substantially on a line 5—5 of Fig. 4.

Sliding engagement of the lateral support 21 to the vertical columns 17 is effected through the use of tubular slides 29 which are secured to the opposite ends of the lateral support and which embrace the stationary support columns 17. Associated with the slides 29, as shown in Figs. 4 and 5, are end sheaves 31 which are mounted for rotation at the juncture of the lateral support and each tubular slide on a cross shaft 32. Secured to the central portion of the diagonal support 21 and adjacent opposite sides of the hydraulic cylinder, are center sheaves 33 mounted for rotation on shafts 34, as shown in Figs. 2 and 3. As is shown in Figs. 2 and 3, center sheaves 33 rotate in horizontal planes, while end sheaves 31 rotate in vertical planes.

Extending downwardly along each of the support columns 17 are cables 36, the cables being anchored to cable anchors 37 on the upper ends of support columns 17 by anchor ferrules 38. The cables 36 embrace and are redirected by end sheaves 31, from which they extend inwardly along the lateral support 21. As shown in Figs. 2 and 3, the cables also embrace and are redirected by the center sheaves 33, from whence they pass along shaft 23 and are anchored to crosshead 24 by ferrules 39. Thus secured, the cables 36 form a suspension sling for raising and lowering the car platform 16 on vertical columns 17. By effectively shortening the length of cable 36 between their column anchorage on the cable anchors 37 and their engagement with end sheaves 31, the car platform 16 is elevated relative to the vertical columns 17. As may be understood from Fig. 3, such effective shortening of the extent of the cable 36 along the columns for lifting the platform is accomplished by movement of crosshead 24 along shaft 23, thereby pulling the ends of the cables and shortening their effective lengths along the columns.

Outer end 41 of the shaft 23 in the disclosed structure is secured to a lateral brace 42 by a bracket 43, which lateral brace 42 is secured to the flared and inclined ends 45 of the car runways 22.

The car lift unit 16 thus described may be used in combination with similar units to form the multiple car lift system as shown in Fig. 1. Where the unit 16 is used adjacent to other units, each column base 18 will support two vertical support columns 17. Added rigidity and strength of these support columns is achieved by a brace tube 44 which extends between and is secured to the cable anchors 37 of adjacent columns mounted on the same column base.

The slide arrangement by which the lateral support 21 is slidably engaged to each of the vertical support columns 17 is shown in detail in Figs. 4 and 5. Such slide comprises a tubular housing 46 embracing the column 17 and a cover plate 47 secured to the housing as by weld joint 48. Each cover plate 47 is adapted to extend over and protect one of the end sheaves 31. The housing and cover plate of the slide are suitably secured to the lateral support 21, as by welding, riveting or the like. Preferably the cables 36 extend upwardly from end sheave 31 inside of housing 46.

To facilitate movement of the slides upon support columns 17, a plurality of bearing assemblies are provided inside of the tubular slide housing 46 in circumferentially and axially spaced relationship to one another. Each bearing assembly includes a bearing holder 51 which is adjustably secured to the housing and supports rollers 53 having concave surfaces for engagement with the column 17. Each bearing assembly is supported in the interior of the slide housing by a cap screw 52 which serves to effect adjustment of the bearing assembly into contact with the column surface. In the disclosed structure, such roller bearings are formed with concave surfaces complementary to the diameter of the support columns 17. As shown in Fig. 5, four equally spaced bearing assemblies 49 are used to effect a secure engagement of the slide to the column. To maintain alignment of the housing with the support column, bearing assemblies 49 are provided in both the upper and lower portions of the housing.

Since in the preferred embodiment of the invention two cables 36 are utilized on each column 17, the end sheaves 31 have double cable receiving channels 56. The sheaves are rotatably mounted on the bracket 47 by the shafts 32 and anti-friction roller bearings 58.

Figures 6, 7:
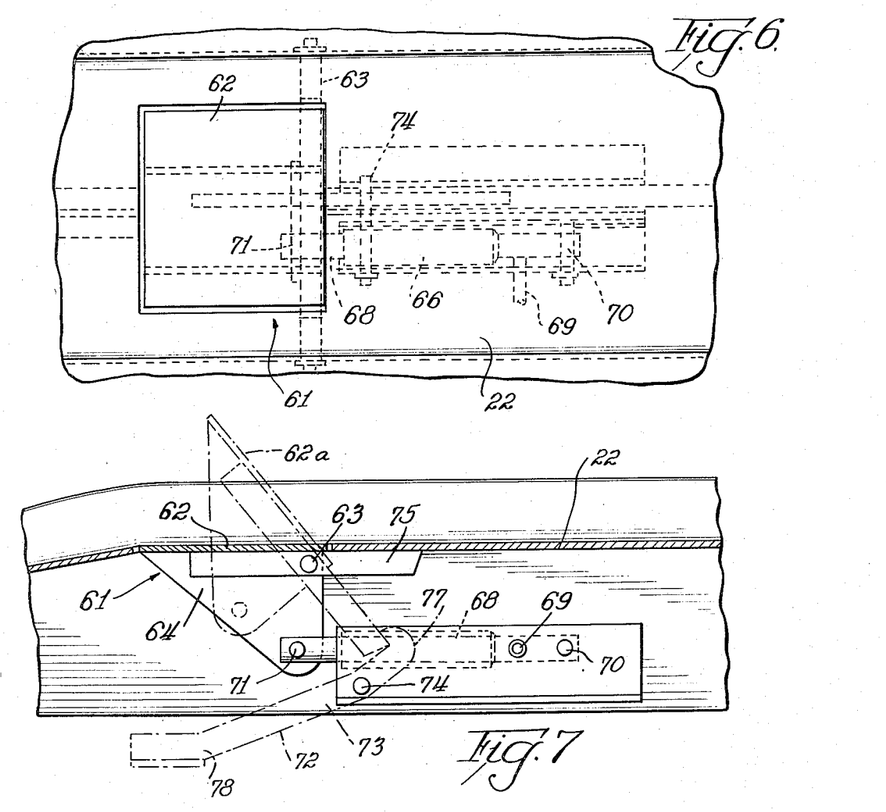
Figs. 6 and 7 are respectively fragmentary plan and side views of a portion of a car runway of the disclosed car lift showing details of a preferred wheel chock mechanism having an automatically releasable lock.
Figure 8:
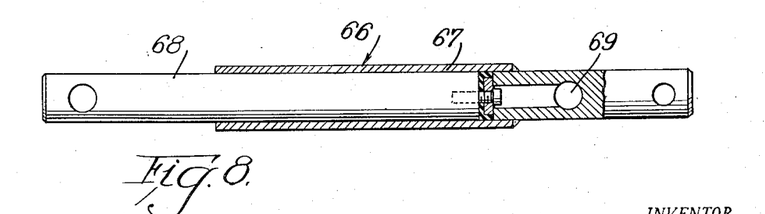
Fig. 8 is a side sectional view of a hydraulic cylinder utilized to actuate the wheel chock mechanism shown in Figs. 6 and 7.

As shown in Figs. 3, 6 and 7, one of the runways 22 is provided with a wheel chock mechanism 61 located near the end of the runway. This wheel chock mechanism, in the disclosed structure, comprises a movable barrier 62 hingedly mounted on the runway by pin 63. The barrier 62 is supported by a triangular brace 64 extending downwardly from the under side of the barrier and being connected to a hydraulic ram 66. The hydraulic ram comprises a cylinder 67 enclosing a piston 68 adapted to be projected from the cylinder by the application of pressure fluid from the hydraulic system. Suitable connections are provided, as shown at 69, for introducing the pressure fluid to the cylinder. The exposed end of the piston 68 is pivotally connected to the triangular brace 64, as by pin 71. The end of the cylinder opposite the piston is movably anchored to the runway by a pin 70. By this construction, the movement of the piston upon being actuated by the pressure fluid forces the triangular brace 64 outwardly and pivots the barrier 62 upon pin 63 to a position such as that shown in dot and dash lines at 62a in Fig. 7.

Being thus disposed, the barrier obstructs the end of the car runway 22 thereby insuring the safety of the car while the platform 16 is in an elevated position.

A safety release lock 72 is provided in connection with the wheel chock mechanism to insure against the lowering of the barrier because of a lessening of pressure fluid from the hydraulic system. Such safety release lock comprises a latch bar 73 pivotally secured to the runway by pin 74. The upper end portion of the bar is provided with a pawl 77 adapted to engage a projecting end of a latch strip 75 secured to the barrier when the latter is in its elevated position. From pin 74, the bar 73 extends downwardly to provide a release lever portion 78 which normally gravitates to a position below the level of the lower side of the runway 22 when the platform is elevated. The safety release lock operates by engagement of pawl 77 with the latch strip 75 on the elevated barrier to maintain the barrier in its elevated position irrespective of the action of the hydraulic piston 66 as long as the platform is elevated. When the platform reaches the ground or is adjacent thereto, the release lever portion 78 of the bar contacts the surface of the parking lot and is forced upwardly, thereby pivoting the bar on pin 74 and disengaging pawl 77 from the barrier latch strip. The barrier, after being freed, drops to the level of the runway and offers no obstacle to an automobile being driven off the runway.

Figure 9:
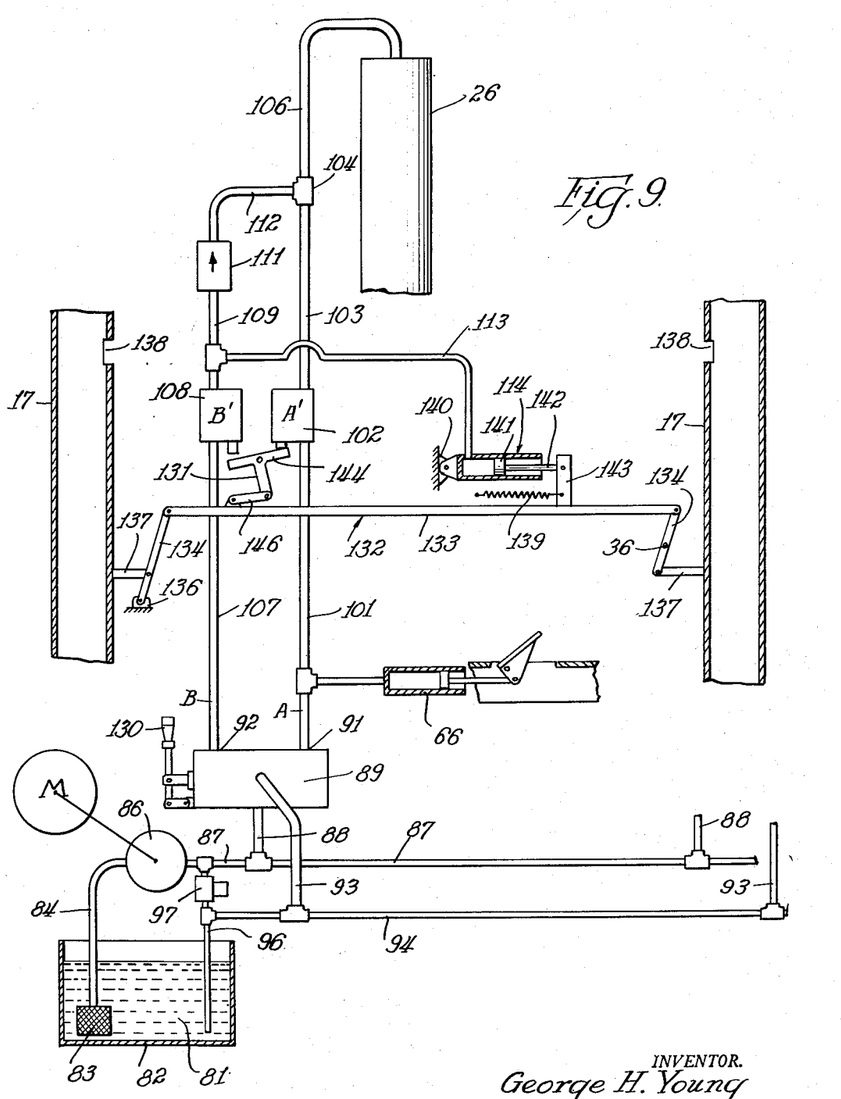
Fig. 9 is a diagrammatic view illustrating a preferred hydraulic system utilized in actuating various parts of my car lift apparatus.

The hydraulic system utilized in operating the car lift unit and its various features is illustrated diagrammatically in Fig. 9. As there depicted, the hydraulic fluid 81 is contained in a fluid reservoir 82 from which it is withdrawn through a screen 83 and supply pipe 84 for use in the system. The supply pipe 84 leads to an electrically operated pump 86, which pump forces the hydraulic fluid under pressure through a supply line 87 which may be used to deliver the fluid to the hydraulic systems of several of the car lift units 16 of the car parking system. Branch supply lines 88 conduct the fluid into the hydraulic system of the individual car lift units.

Master control valve 89 receives the fluid from line 88 and directs its path of flow through the hydraulic system. The control valve 89, as will be hereinafter described in detail, includes an inlet port to which line 88 is connected and two outlets 91 and 92 for the selective flow of the fluid under pressure into its lines of flow through the hydraulic system. Also connected to the control valve 89 is branch exhaust pipe 93 leading to fluid return pipe 94 through which the exhausted fluid from the system is returned to the reservoir 82 by conduit 96. To insure against undesirably high pressures in the system, a relief valve 97 is connected as a by-pass between supply line 87 and conduit 96.

The hydraulic system beyond the master control valve 89 may be considered as two lines of flow of the hydraulic fluid, line A and line B, which begin at the two outlets 91 and 92 of the valve 89 and which eventually join together with a common connection to the hydraulic lift cylinder 26. Line A comprises a pipe 101 extending from outlet 91 of the control valve 89 to a valve 102, also referred to as valve A'. Connected to pipe 101 is hydraulic cylinder 66 which is adapted to actuate the wheel chock mechanism. The valve A' is normally open so that the pressure fluid directed into line A by valve 89 passes through the valve and into pipe 103 where it makes a common connection at 104 with both line B and with a pipe 106 communicating with the hydraulic lift cylinder 26.

Line B extends from the outlet 92 of the master control valve 89 through pipe 107 and into valve 108, also referred to as valve B'. Valve B' is normally closed, thereby normally preventing the flow of the pressure fluid therethrough. Pipe 109 connects valve B' with check valve 111. The check valve is adapted to permit the flow of fluid only from pipe 109 to pipe 112. From check valve 111, pipe 112 leads to connection 104 where line B joins both line A and pipe 106 which connects to the hydraulic lift cylinder 26. Connected to pipe 109 of line B between valve A' and check valve 111 is branch pipe 113 leading to a hydraulic ram 114. The hydraulic ram 114 is adapted to actuate a safety lock device as will be hereinafter described.

Figure 10:
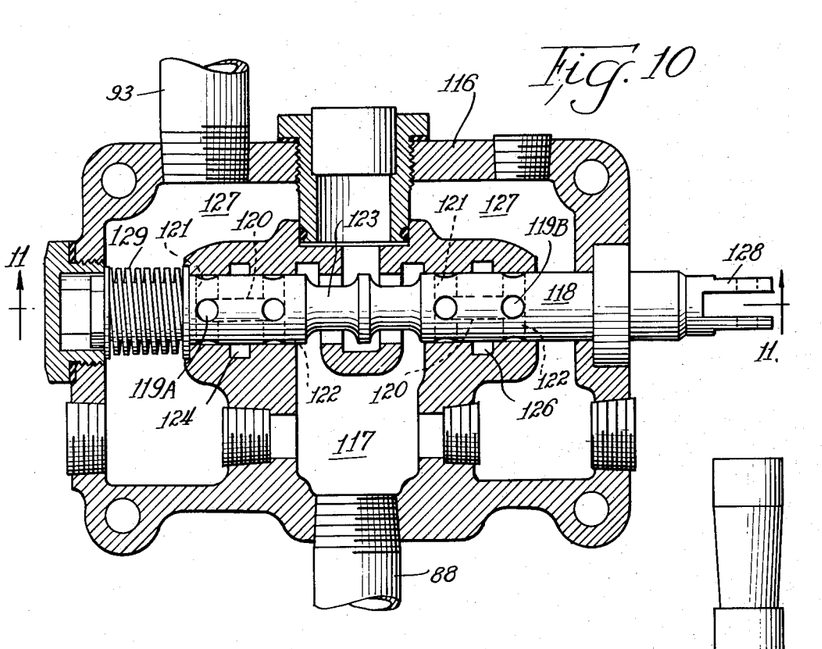
Figs. 10 and 11 are respectively top and side sectional views of a preferred type of control valve that may be used in the hydraulic system shown in Fig. 9, and wherein the section for Fig. 11 is taken substantially on a line 11—11 of Fig. 10.
Figure 11:
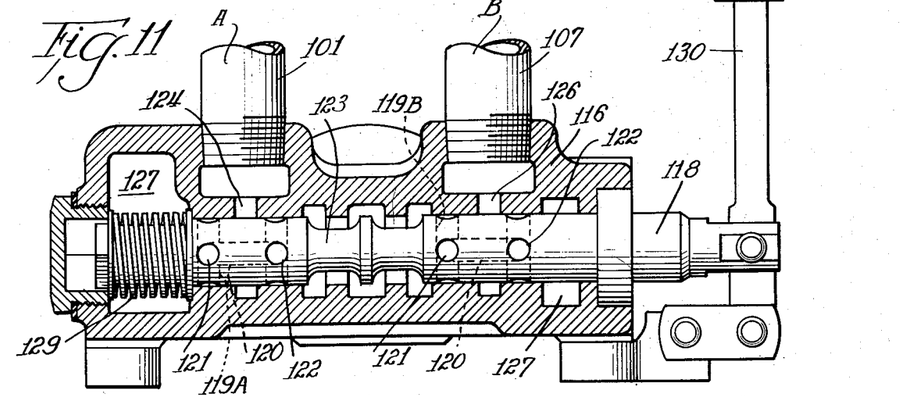
Figure 12:
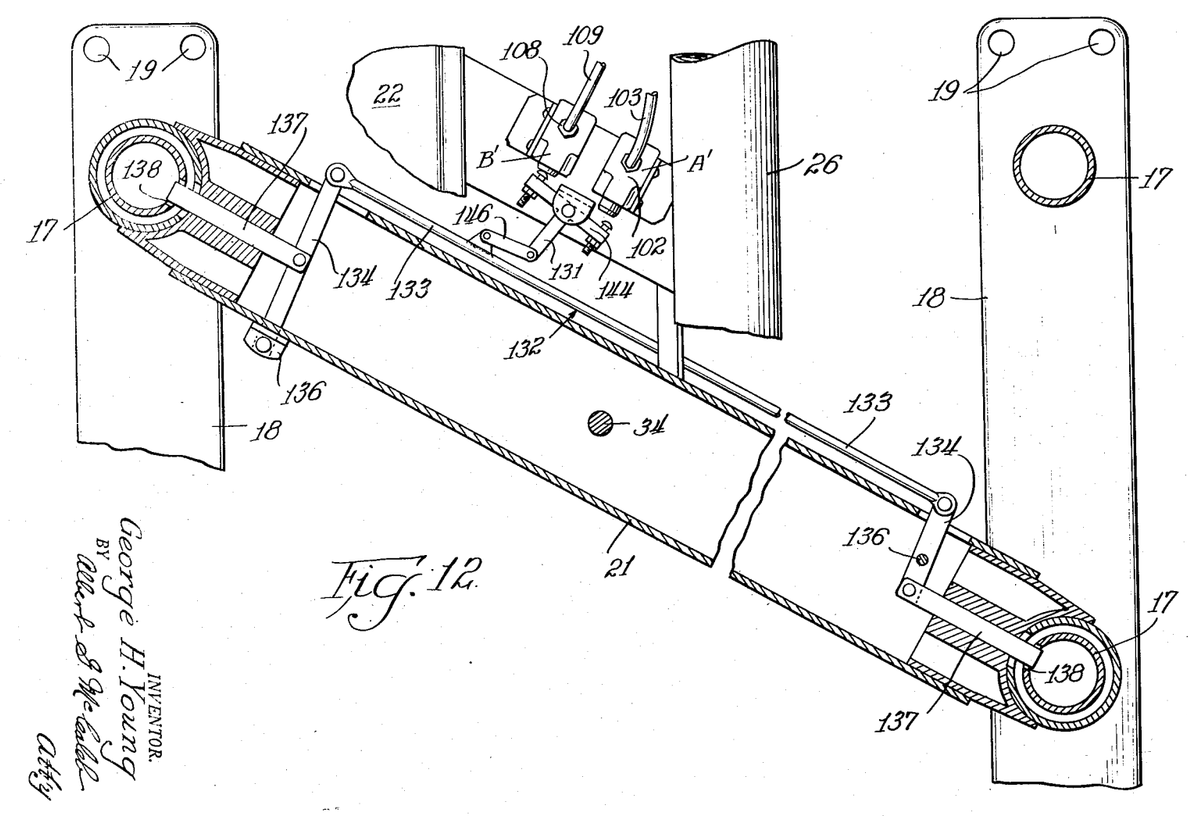
Fig. 12 is a fragmentary sectional plan view of a portion of the lift structure taken substantially on a line 12—12 of Fig. 2.

The master control valve 89, as shown in detail in Figs. 10 and 11, comprises a valve housing 116 defining an inlet chamber 117 which is connected to branch supply line 88. Passage from the inlet chamber 117 through the control valve is governed by control rod 118 having passages 119A and 119B therein; the passages comprising radially extending bores 121 and 122 connected by longitudinally extending bores 120. Between passages 119A and 119B in the control rod is a barrier portion 123. As shown in Figs. 10 and 11, the control rod is in a neutral position in which the inlet and outlet passages are closed. When the control is shifted in one direction or the other from that neutral position, the passages 119A and 119B direct the flow of fluid from the inlet chamber 117 either into channel 124, which is connected to line A, or into channel 126, leading to line B. The passages 119A and 119B are also adapted to pass the fluid from either channel 124 or channel 126 into exhaust chamber 127, which is connected to branch exhaust pipe 93.

The control rod 118 is movable axially within the housing 116 to various positions permitting the alignment of the bores 121 and 122 with the various chambers. A bifurcated end 128 is provided on the control valve and projects from the valve housing for connection with a manually movable operating lever 130 for moving the control rod. Within the valve 89, spring 129 places the rod 118 under tension at any position.

In the disclosed valve, the control rod 118 is adapted to be used in three positions. In neutral position, where the control rod is centered in valve 89, the passages 119A and 119B do not open on any chamber and a central barrier portion 123 of the rod is positioned within chamber 117. Thus, the fluid entering the valve 89 from supply pipe 88 is confined in chamber 117 by the barrier portion 123 of the control rod and the hydraulic system is then closed. To permit the flow of the pressure fluid through outlet 91, control rod 118 is withdrawn outwardly from the housing so that passage 119A connects chamber 117 and channel 124, thereby forcing the fluid through outlet 91. When the rod is in this outward position, the passage 119B connects channel 126 with exhaust chamber 127, thereby permitting the fluid to exhaust from line B and to return to the reservoir 82 via exhaust pipe 93. To force the fluid through outlet 92, the control rod 118 is moved inwardly in the housing so that passage 119B connects inlet chamber 117 to channel 126. From the channel 126, the fluid passes through outlet 92 and into line B of the hydraulic system. With the control rod in this position, passage 119A connects channel 124 with chamber 127 so that the fluid exhausts from line A into the reservoir. The control valve 89 thus directs the flow of fluid under pressure into either of the lines A or B while permitting the fluid to exhaust from the line not under pressure.

Control valves A' and B' are actuated by hydraulic ram 114, which is suitably connected to a valve operating means 131 for alternatively opening one valve while closing the other. As shown in Fig. 9, the hydraulic ram 114 and valve operating means 131 are operatively connected by a safety lock mechanism 132. The safety lock mechanism 132 extends across the platform of each lift unit within the lateral support 21 and includes parts which automatically lock into upright columns 17 when the car platform reaches its highest elevation. Once engaged, the safety lock maintains the elevation of the platform irrespective of a lessening of fluid pressure within the system. The safety lock 132 comprises a link 133 extending laterally between the columns 17 and pivotally engaged on each end to a lever 134, the levers being in turn pivotally secured to the car platform as by bracket and pin assemblies 136. The ends of levers 134 are pivotally secured to latch bars 137 which are adapted to be advanced toward and retracted from column 17 by a corresponding movement of the link 133. The latch bars 137 have suitably shaped ends for insertion into openings 138 in vertical columns 17.

The link 133 is urged by spring 139 in a direction adapted to force the latch bars into openings 138. Thus, when the car platform is elevated, bars 137 slide along the columns and bear thereagainst until openings 138 are reached; at this point they are snapped into locking engagement with the columns. The hydraulic ram 114, secured to the car platform by bracket and pin assembly 140, includes piston 141 and piston rod 142, the piston rod being connected to arm 143 projecting from link 133. Valve operating means 131 comprises a T-shaped trigger 144 pivotally secured by a trigger arm 146 to the link 133 adjacent valves A' and B'. By this arrangement, movement of the link 133 pivots the trigger 144 which, in turn, opens one of the valves A' and B' while closing the other.

In the operation of the hydraulic system thus described, the lever 130 of the control valve 89 is moved outwardly, thereby pulling the control rod 118 of the valve to its outward position. This enables the fluid to pass under pressure through the control valve and into line A. The fluid passes through pipe 101 and into hydraulic ram 66 thereby actuating the wheel chock mechanism to raise the wheel barrier. The fluid continues to flow through pipe 101 and through valve A' which is normally open, because of the restrained position of link 133 resulting from the engagement of bars 137 with columns 17. Entry of the fluid into line B through the connection 104 is prevented by the one-way check valve 111. The fluid, after passing through valve A' and pipe 103, passes through the pipe 106 and into the hydraulic lift cylinder 26. This cylinder, being actuated by the fluid pressure, forces its piston 27 along the shaft 23 and moves crosshead 24. The lengths of the cables along the column 17 are thus shortened, and the car platform is raised along the support columns.

When the car platform has reached its highest elevation, latch bars 137 engage openings 138 and maintain the platform in its elevated position even though there may be some loss of pressure in the hydraulic system.

In lowering the car platform, it is necessary to first disengage latch bars 137 from the columns. If the hydraulic pressure diminishes after a period of time due to any slight leak, the latch bars 137 may be held in the openings 138 by the weight of the automobile. For easy disengagement of the latch bars, it is necessary to re-establish the fluid pressure in the system slightly to elevate the car platform. It is also desirable to re-establish the pressure in the hydraulic system to prevent sudden descent of the car when the latch bars are disengaged from the columns. Re-establishment of the pressure in the system is done by moving lever 130 and control rod 118 inwardly in valve 89. This directs the flow of fluid under pressure through line B and permits the fluid in line A to exhaust back into the reservoir. The fluid passes through pipe 107 and through valve B' which was opened by trigger 144 when the latch bars 137 entered the openings 138 of the columns. The fluid then passes through pipe 109, valve 111, and pipes 112 and 106, and into the hydraulic lift cylinder 26 which raises the platform.

As the fluid passes through pipe 109, it partially by-passes through pipe 113 to actuate hydraulic cylinder 114. The action of hydraulic cylinder 114 urges link 133 into its extended position which withdraws latch bars 137 from their engagement with openings 138. As the link moves into its extended position, trigger 144 opens valve A' while closing valve B'. This permits the fluid in line A to exhaust into the reservoir. The car platform then descends by gravitational force acting against the controlled return of fluid to the reservoir. Simultaneously, hydraulic pressure is removed from the wheel chock mechanism.

The hydraulic system described is particularly suitable for use with a plurality of car lift units 16. The reservoir, pump, and the supply and exhaust lines may be common to several units. Each unit has its master control valve 89 which may be supported away from the unit and independent of the car platform. The other component parts of the system normally associated with the platform are suitably connected to the control valve 89 as by flexible tubing or hose.

Figure 13:
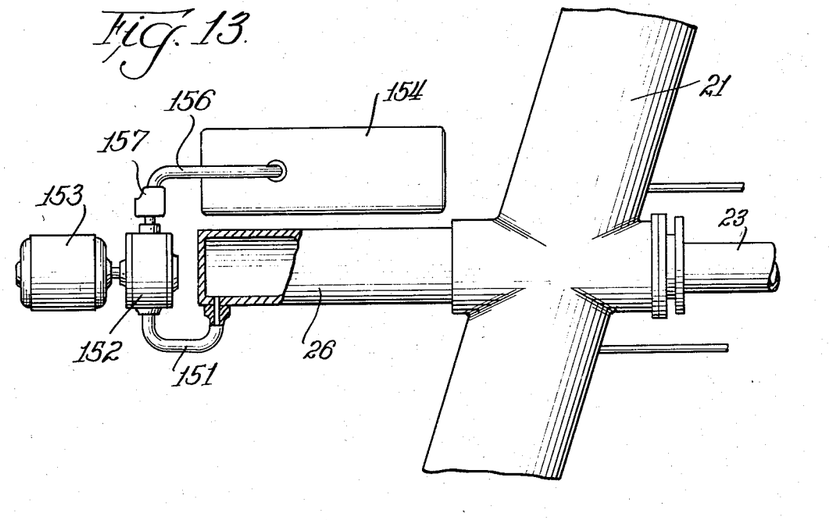
Fig. 13 is a fragmentary plan view, partly in section, of a portion of a car lift platform and depicting a modified form of platform elevating structure.

A modified form of the invention is illustrated in Fig. 13 and contemplates the use of a complete hydraulic fluid pressure system associated with each car platform. In this embodiment, as in the previously described form, hydraulic cylinder 26 is carried by the lateral support 21 and the piston is movable along the guide rod 23. The cylinder 26 is connected by a pipe 151 to a pump 152 driven by suitable means, such as electric motor 153. The pump 152 withdraws fluid from a reservoir 154 through a pipe 156 and flow control valve 157 to supply fluid under pressure to the cylinder, thereby to effect movement of the piston for raising the platform.

In the operation of the hydraulic system utilized in this embodiment, the car platform is elevated by starting motor 153 to establish the fluid pressure in the system. A wheel chock mechanism and a safety lock may each be operated in a manner similar to that described in connection with the preferred embodiment to achieve like safety features. In lowering the car platform, the fluid from the cylinder 26 is exhausted back into the reservoir 154 at a controlled rate.

Figure 14:
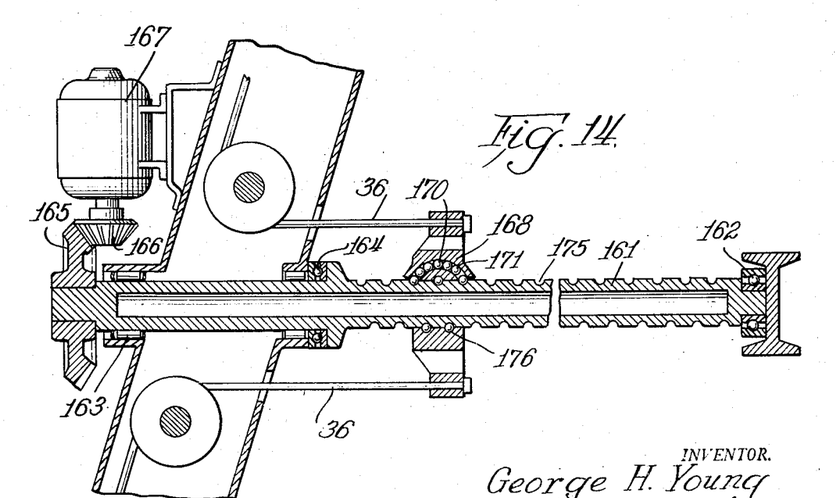
Fig. 14 is a fragmentary plan view, partly in section, of the car platform illustrating a further modification of the elevating means utilized in the invention.

A further modification of the invention, as illustrated in Fig. 14, comprises a mechanically driven means for raising and lowering the car platform. As shown, a helically grooved shaft 161 is utilized as a mechanical expedient for producing the lifting force for raising a car platform in place of the hydraulic ram system of my preferred embodiment. The shaft 161 is rotatably mounted on the lateral support for the car platform by bearings 162, 163 and 164. One end of the shaft 161 has a bevel gear 165 secured thereto and meshed with a bevel gear 166 on the drive shaft of a suitable power source, such as an electric motor 167.

Embracing the shaft 161, mounted for rotational and axial movement relative thereto, is crosshead 168. A series of balls 170 traveling in a passage 171 of the crosshead and through adjacent spiral grooves 175 and 176 in the shaft 161 and crosshead 168 provide an anti-friction thread type connection for driving the crosshead axially of the shaft in response to rotation of the shaft.

In this embodiment, the car platform is raised by the action of the shaft 161 on crosshead 168. The shaft 161 is rotated by power source 167 and forces crosshead 168 along the shaft. This effects extension and retraction of the cables 26, thereby raising and lowering the platform.

Either of the two modifications just described may be used for the multiple car lift system described in Fig. 1. In such instance, the particular lifting means are fitted to the individual car platforms and operated by their own power source.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A car lift which comprises, in combination, a pair of support columns mounted uprightly in spaced relationship to define a car parking stall, said columns being spaced from opposite sides of a lateral center line of the stall, a car lifting platform including a lateral support extending between the support columns and having runways for car wheels mounted thereon in diagonal relationship thereto and at positions such that the weight of the car when on said runways is practically balanced relative to the lateral support, slides of substantial length embracing the stationary parts of the columns and movable therealong, said slides being secured to the opposite ends of the lateral support, end sheaves mounted on the opposite ends of the lateral support adjacent said slides, a cable anchored to the upper end of each of said support columns and extending downwardly therefrom to be received and redirected by one of said end sheaves, and means mounted on said lateral support and engaging the other ends of said cables to form a cable suspension sling for said car lifting platform, said means having a movable portion to pull said cables relative to said end sheaves whereby the length of said cables from their column anchorage to said end sheaves is shortened and said car lifting platform is raised relative to said columns.

2. A car lift as defined in claim 1, in which said means comprises a shaft extending longitudinally along said car lifting platform, a crosshead slidably engaging said shaft and holding the ends of said cables, and means for moving said crosshead along said shaft.

3. A car lift as defined in claim 1, in which said means comprise a shaft extending longitudinally along said car lifting platform, a crosshead slidably engaging said shaft and holding the ends of said cables, and an hydraulic cylinder engaging said crosshead and movable lengthwise of said shaft, said hydraulic cylinder being adapted to move said crosshead along said shaft.

4. A car lift as defined in claim 1 in which said means comprise a shaft extending longitudinally along said car lifting platform, a crosshead slidably engaging said shaft and holding the ends of said cables, an hydraulic cylinder engaging said crosshead and movable lengthwise of said shaft, and fluid pressure generating means, and an hydraulic system connecting said fluid pressure generating means to said hydraulic cylinder but being independent of said platform, said hydraulic cylinder being adapted to be actuated through said hydraulic system by said fluid pressure generating means and to move said crosshead along the shaft.

5. A car lift as defined in claim 1, in which said means comprises a shaft extending longitudinally along said car lifting platform, a crosshead slidably engaging said shaft and holding the ends of said cables, an hydraulic cylinder engaging said crosshead and movable lengthwise of said shaft, and a fluid pressure generating means supported on said car lifting platform and an hydraulic system connecting said fluid pressure generating means to said hydraulic cylinder, said hydraulic cylinder being adapted to be actuated through said hydraulic system by said fluid pressure generating means and to move said crosshead along the shaft.

6. A car lift as defined in claim 1, in which said means comprises a helically-grooved shaft extending longitudinally along said car lifting platform and rotatably connected thereto, a crosshead in thread-like engagement with the helical grooves of said shaft and movable therealong, said crosshead holding the ends of said cables, and means for rotating said shaft and thereby moving said crosshead along said shaft.

7. A car lift which comprises, in combination, a pair of support columns mounted uprightly in spaced relationship to define a car parking stall, said columns being spaced from opposite sides of a lateral center line of the stall, a car lifting platform including a lateral support extending between the support columns and having runways for car wheels mounted thereon in diagonal relationship thereto and at positions such that the weight of the car when on said runways is practically balanced relative to the lateral support, slides of substantial length embracing the stationary parts of the support columns and movable therealong, said slides being secured to the opposite ends of the lateral support, end sheaves mounted on the opposite ends of the lateral support adjacent said slides, center sheaves mounted in the central portion of said lateral support, a cable anchored to the upper end of each of said support columns and extending downwardly therefrom to be received and redirected by one of said end sheaves, said cables extending from said end sheaves to said center sheaves and being received and redirected by said center sheaves, and means mounted on said lateral support and having the ends of said cables secured thereto so that said cables form a suspension sling for said car lifting platform, said means having a movable portion to pull said cables relative to said end sheaves and said center sheaves whereby the length of said cables from their column anchorage to said end sheaves is shortened and said platform is raised relative to said columns.

References Cited in the file of this patent
UNITED STATES PATENTS 620,585    Hayes ________________ May 7, 1899

(Other references on following page)

UNITED STATES PATENTS

| | | |
|---|---|---|
| 1,303,978 | Smith | May 20, 1919 |
| 1,960,283 | Walker | May 29, 1934 |
| 1,978,622 | Clapp | Oct. 30, 1934 |
| 1,979,788 | Bacher | Nov. 6, 1934 |
| 2,053,368 | Hott | Sept. 8, 1936 |
| 2,242,891 | Light | May 20, 1941 |
| 2,517,318 | Jeffers | Aug. 1, 1950 |
| 2,573,587 | McGraw | Oct. 30, 1951 |

FOREIGN PATENTS

| | | |
|---|---|---|
| 748,082 | France | Apr. 10, 1933 |